United States Patent [19]
Enomoto

[11] Patent Number: 6,064,532
[45] Date of Patent: May 16, 2000

[54] APPARATUS FOR CORRECTING TREMBLING OF A FOCUSED IMAGE

[75] Inventor: Shigeo Enomoto, Tokyo, Japan

[73] Assignee: Asahi Kogaku Kabushiki Kaisha, Tokyo, Japan

[21] Appl. No.: 09/296,272

[22] Filed: Apr. 22, 1999

[30] Foreign Application Priority Data

Apr. 24, 1998 [JP] Japan .................................. P10-114733

[51] Int. Cl.[7] .................................................. G02B 15/14
[52] U.S. Cl. ............................................. 359/694; 359/704
[58] Field of Search .................................. 359/694, 554, 359/555, 556, 557, 811, 823, 704

[56] References Cited

U.S. PATENT DOCUMENTS

| | | | |
|---|---|---|---|
| 5,461,513 | 10/1995 | Maruyama | 359/837 |
| 5,754,339 | 5/1998 | Kanai et al. | 359/557 |

FOREIGN PATENT DOCUMENTS

| | | | |
|---|---|---|---|
| 6-43365 | 2/1994 | Japan | G02B 23/00 |
| 6-308431 | 11/1994 | Japan | G02B 27/64 |
| 10-20213 | 1/1998 | Japan | G02B 23/18 |
| 10186228 | 7/1998 | Japan | G02B 13/02 |

*Primary Examiner*—Georgia Epps
*Assistant Examiner*—Younggil Timothy Lee
*Attorney, Agent, or Firm*—Greenblum & Bernstein, P.L.C.

[57] ABSTRACT

Binoculars are provided with correction lenses which correct a trembling of a focused image. The correction lenses are driven by stepping motors. The difference between an angular position data of optical axes of the binoculars and a driving amount of the correction lenses driven by the stepping motors is calculated. If the difference exceeds a positive threshold value, the stepping motor is rotated clockwise, and if the difference is below a negative threshold value, the stepping motor is rotated counterclockwise in order to cancel the difference. When the difference is between the positive threshold value and the negative threshold value, the stepping motor is not rotated. The threshold value is determined to be a quarter of the driving amount of the correction lenses, which corresponds to one rotational step of the stepping motor.

7 Claims, 10 Drawing Sheets

APPARATUS FOR CORRECTING TREMBLING OF A FOCUSED IMAGE

BACKGROUND OF THE INVENTION

1. Field of the Invention

The present invention relates to an apparatus that corrects trembling of a focused image caused by, for example, camera-shake.

2. Description of the Related Art

Conventionally, there is an optical device, such as binoculars, provided with an apparatus for correcting trembling of a focused image. The apparatus for correcting the trembling includes correction optical systems. The correction optical systems move such that movement of an optical axis of the optical device is canceled, enabling the trembling of the focused image to be corrected.

There is known a direct-drive-actuator, which includes a stepping motor as a driving mechanism of the correction optical systems. The driven amount of the correction optical systems, corresponding to one drive step of the stepping motor, is determined by taking a construction of the correcting mechanism into consideration, and is based on a least upper bound of the driving frequency of the stepping motor, whereby the movement of the correction optical systems is able to follow a movement, at a usual speed, of the focused image from a focal point.

However, if a hand trembling occurs at a slower than usual speed, it is impossible to lower the driven amount of the correction optical systems, since the stepping motor is utilized as a driving source. Thus, the positional resolution of the correction optical systems is large in comparison with the slow hand trembling and the correction optical systems move in accordance with one drive step of the stepping motor, and as such an image jump is perceived from a distance of distinct vision, causing discomfort to the sight of a viewer. On the other hand, if the driven amount of the correction optical systems corresponding to one drive step is lowered in order to prevent the image jump, the correction optical systems can not adequately correct trembling resulting from usual speed hand trembling.

SUMMARY OF THE INVENTION

Therefore, an object of the present invention is to provide a correction apparatus correcting the trembling of a focused image, while preventing image jump.

In accordance with an aspect of the present invention, there is provided an apparatus that corrects a trembling of a focused image comprising: a detector that detects a trembling amount of an optical device; correction optical systems that correct a trembling of a focused image caused by a tremble of the optical device; a driving device that drives the correction optical systems by a predetermined amount per one drive step; and a controller that controls the driving device such that, when a difference between the trembling amount detected by the detector and a position data of the correction optical systems, which is calculated based on a one step driving amount of the driving device, reaches a predetermined threshold value, the driving device is driven to cancel the difference. The predetermined threshold value is pre-set to less than a half of the driving amount of the correction optical systems corresponding to one drive step of the driving device.

The predetermined threshold value is pre-set within a range of one third to one tenth of the driving amount of the correction optical systems corresponding to one drive step of the driving device.

The predetermined threshold value is determined to be a quarter of the driving amount.

The driving device includes at least one stepping motor, and the optical device is binoculars including a pair of telephoto optical systems.

In accordance with another aspect of the present invention, there is provided an apparatus that corrects a trembling of a focused image comprising: a detector that detects a trembling amount of an optical device; correction optical systems that correct a trembling of a focused image caused by a tremble of the optical device; a driving device that drives the correction optical systems by a predetermined amount per one step; and a controller which controls the driving device such that, when a difference between the trembling amount detected by the detector and a position data of the correction optical systems, calculated based on one step driving amount of the driving device, exceeds one of a positive value of a predetermined threshold and a negative value of the predetermined threshold value, the driving device is driven to cancel the difference. The predetermined threshold value is pre-set to less than a half of the driving amount of the correction optical systems corresponding to one drive step of the driving device.

In accordance with another aspect of the present invention, there is provided an apparatus that corrects a trembling of a focused image comprising: a detector that detects a trembling amount of an optical device; correction optical systems that correct a trembling of a focused image caused by a tremble of the optical device; a driving device that drives the correction optical systems by a predetermined amount; and a controller that controls the driving device such that, when a difference between the trembling amount detected by the detector and a position data of the correction optical systems, which is calculated based on the predetermined amount, reaches a predetermined threshold value, the driving device is driven to cancel the difference. The predetermined threshold value is pre-set to less than a half of the predetermined amount.

DESCRIPTION OF THE PREFERRED EMBODIMENTS

Figure 1:
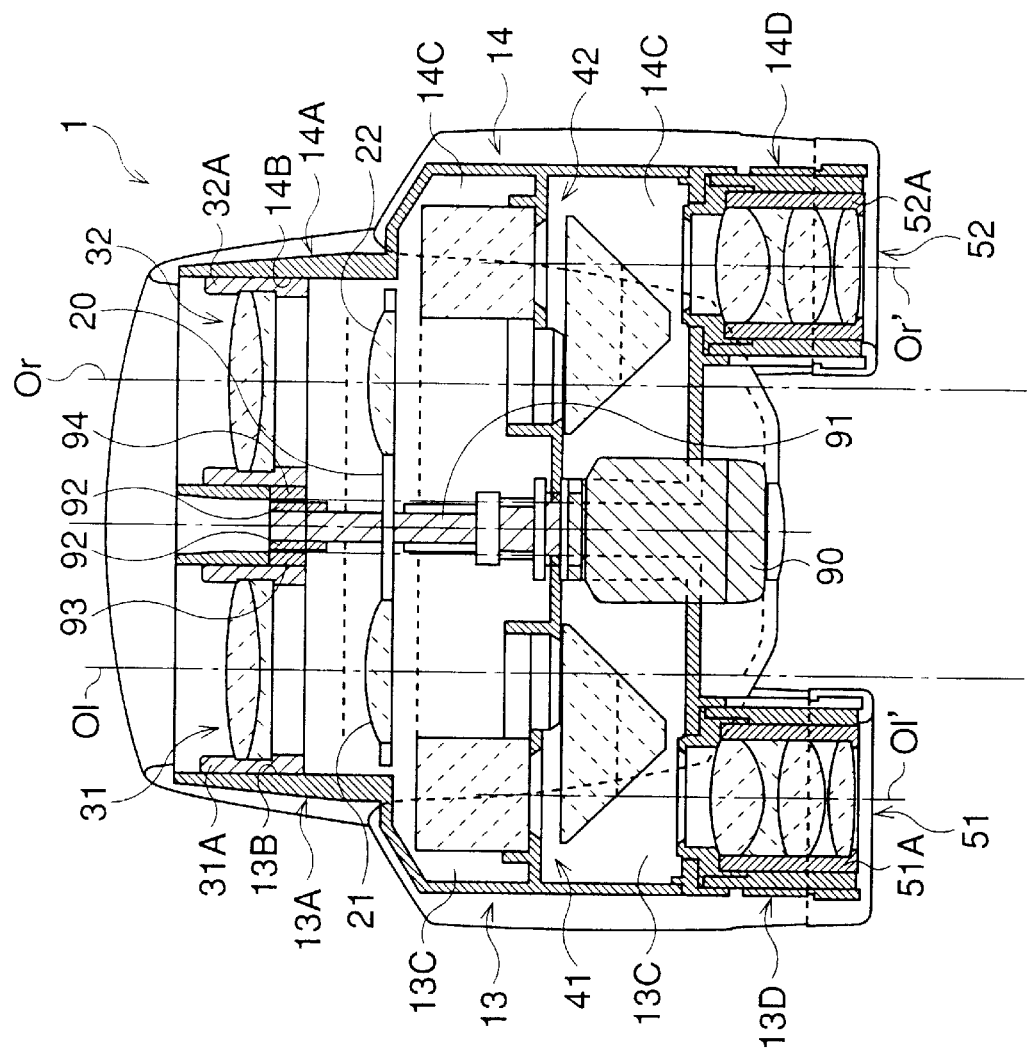
FIG. 1 is a sectional plan view of binoculars incorporating an embodiment according to the present invention.

The present invention will now be described with reference to embodiments shown in the drawings.

Note that, in this specification, "lengthwise direction" means a vertical direction in a state when an optical device, which is provided with a correction apparatus according to the present invention, is normally used, and "lateral direction" means a direction which is perpendicular to the lengthwise direction.

Further, an apparatus for correcting trembling of a focused image of an embodiment, according to the present invention, is incorporated in binoculars including telephoto optical systems.

FIG. 1 is a sectional view of binoculars 1 incorporating the embodiment.

A luminance flux passes a pair of objective lenses 31 and 32, and is directed to a pair of optical inversion systems 41 and 42, through a pair of correction lenses 21 and 22. Each of the optical inversion systems 41, 42 is a Porro prism, comprising two right-angle prisms, which inverts an image thereby producing an erected image. The luminance flux is directed to a pair of eyepieces 51 and 52, after passing through the pair of optical inversion systems 41, 42. Namely, a left telephoto optical system (a first telephoto optical system) comprises the correction lens 21, the objective lens 31, the optical inversion system 41, and the eyepiece 51; and a right telephoto optical system (a second telephoto optical system) comprises the correction lens 22, the objective lens 32, the optical inversion system 42, and the eyepiece 52. Ol is the optical axis of the objective lens 31, Or is the optical axis of the objective lens 32, Ol' is the optical axis of the eyepiece 51, and Or' is the optical axis of the eyepiece 52.

The objective lens 31 is held by an objective lens barrel 31A, and the objective lens 32 is held by an objective lens barrel 32A. The objective lens barrel 31A is supported by an inner surface of a hole 13B provided on an objective lens barrel supporting portion 13A of a left case 13, in such a manner that the objective lens barrel 31A can be moved along the optical axis Ol. Similarly, the objective lens barrel 32A is supported by an inner surface of a hole 14B provided on an objective lens barrel supporting portion 14A of a right case 14, in such a manner that the objective lens barrel 32A can be moved along the optical axis Or.

The eyepiece 51 is held by an eyepiece barrel 51A, and the eyepiece 52 is held by an eyepiece barrel 52A. The eyepiece barrel 51A is securely mounted in an eyepiece barrel supporting portion 13D of the left case 13, and the eyepiece barrel 52A is securely mounted in an eyepiece barrel supporting portion 14D of the right case 14. The Porro prism of the optical inversion system 41, is placed in a prism room 13C provided between the objective lens barrel supporting portion 13A and the eyepiece barrel supporting portion 13D, in the left case 13. Similarly, the Porro prism of the optical inversion system 42, is placed in a prism room 14C provided between the objective lens barrel supporting portion 14A and the eyepiece barrel supporting portion 14D, in the right case 14.

One engaging member (not shown), which faces the prism room 14C, is provided on the outer surface of the prism room 13C, and another engaging member (not shown), which faces the prism room 13C, is provided on the outer surface of the prism room 14C, whereby the prism room 13C and the prism room 14C are engaged with each other.

A rotation ring 90 is provided between the eyepiece barrel 51A and the eyepiece barrel 52A. A rotation ring axle 91 is fixed to the rotation ring 90, along the central axis of the rotation ring 90. A lift axle 92 is threadingly engaged with the rotation ring axle 91. The lift axle 92 is connected to the objective lens barrel 31A by a left arm 93, and is connected to the objective lens barrel 32A by a right arm 94.

When the rotation ring 90 is rotated, rotational movement is transmitted to the lift axle 92 via the rotation ring axle 91, so that the lift axle 92 moves along the optical axes Ol and Or. Namely, the rotational movement of the rotation ring 90 is converted to the longitudinal movement of the lift axle 92, in the direction of the optical axes Ol and Or. In the left telephoto optical system, the movement of the lift axle 92 is transmitted to the objective lens barrel 31A by the left arm 93. Similarly, in the right telephoto optical system, the movement of the lift axle 92 is transmitted to the objective lens barrel 32A by the right arm 94. Accordingly, the objective lens barrels 31A and 32A are moved uniformly and simultaneously, in accordance with the movement of the lift axle 92, in the direction of the optical axes Ol and Or.

Namely, the rotation ring 90, the rotation ring axle 91, the lift axle 92, the left and right arms 93 and 94, and the objective lens barrels 31A and 32A, constitute an integrated focusing unit. The synchronized movement of the objective lens barrels 31A and 32A, along the respective optical axis Ol and Or, is initiated by rotating the rotation ring 90. Accordingly, a focusing operation can be performed by rotating the rotation ring 90 clockwise or counterclockwise by a predetermined amount.

Further, the left case 13 is rotatable around the optical axis Ol of the objective lens 31 and the right case 14 is rotatable around the optical axis Or of the objective lens 32, in accordance with the alternation of engaging position of the engaging members, with respect to each of the prism rooms 13C and 14C of the left case 13 and the right case 14. The rotation of the left case 13 and the right case 14 is synchronized and independent of the integrated focusing unit. The left case 13 and the right case 14 are engaged with the facing engaging members located on the outer surfaces of the prism rooms 13C and 14C. Accordingly, when the left case 13 is rotated clockwise around the optical axis Ol, the right case 14 rotates counterclockwise around the optical axis Or, and when the left case 13 is rotated counterclockwise around the optical axis Ol, the right case 14 rotates clockwise around the optical axis Or, so that the interpupillary distance is adjusted.

Figure 2:
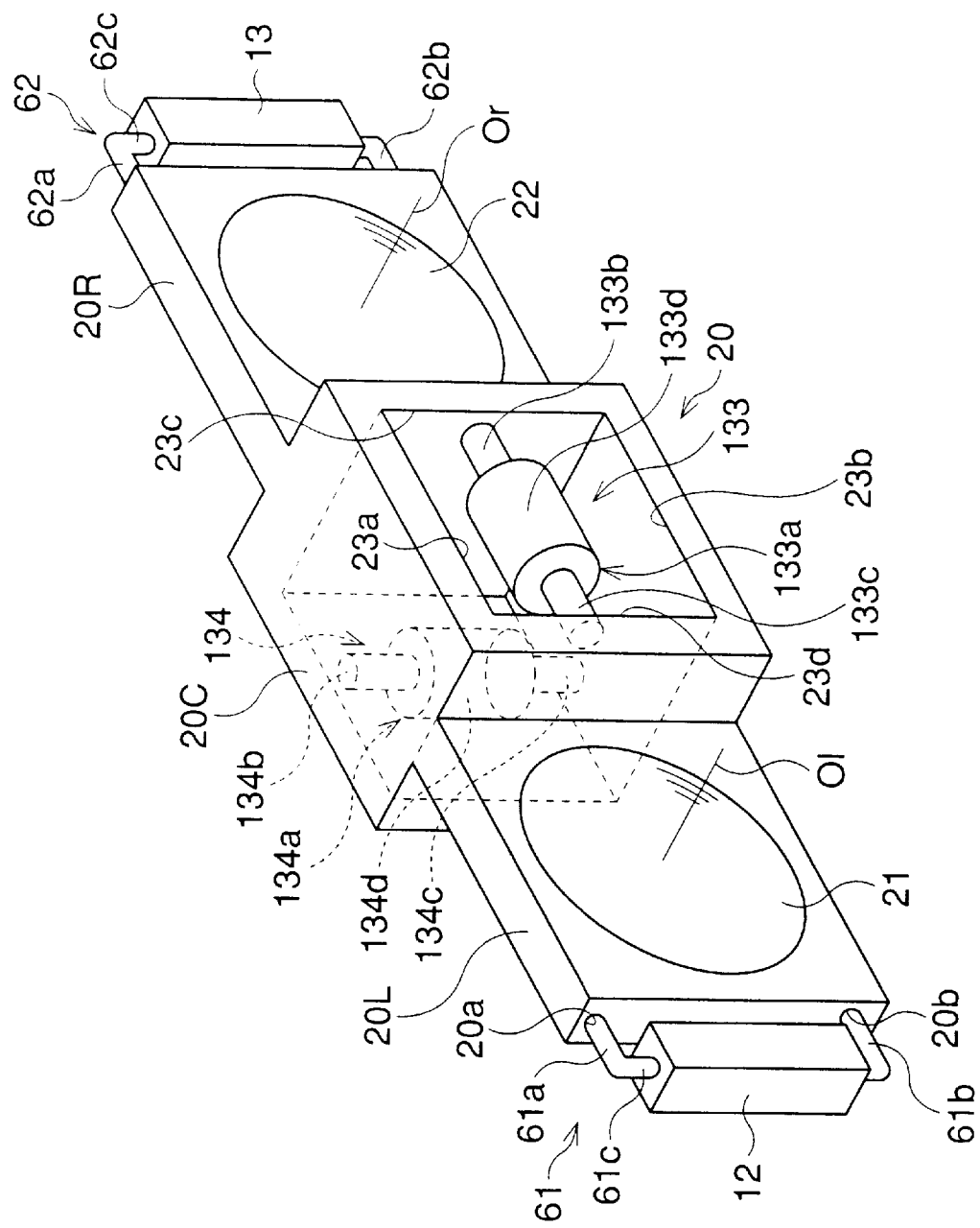
FIG. 2 is a perspective view of an apparatus for correcting a trembling of a focused image, to which the embodiment is applied.
Figure 3:
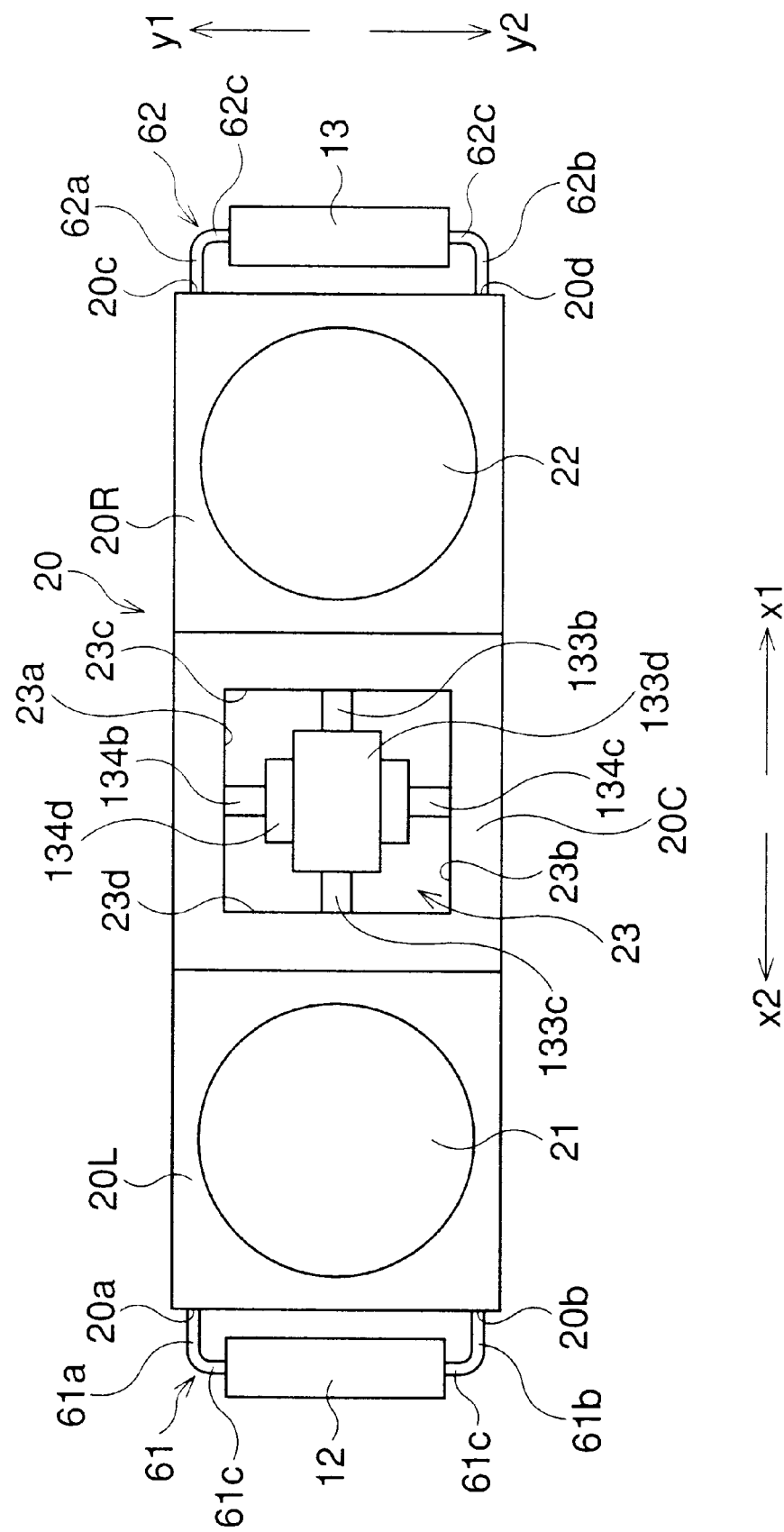
FIG. 3 is a front view of the embodiment shown in FIG. 1.

FIG. 2 is a perspective view showing an apparatus for correcting trembling of a focused image, to which this embodiment, according to the present invention, is applied, and FIG. 3 is a front view of the correction apparatus.

A lens holding frame, generally indicated by reference 20, comprises holding portions 20L and 20R, which hold correction lenses 21 and 22, respectively, and a connecting portion 20C which connects the holding portion 20L and the holding portion 20R. The holding portion 20L and the holding portion 20R are plates, symmetrically placed about the connecting portion 20C, being thick enough to hold the correction lenses 21 and 22.

A hole 20a and a hole 20b, which have a predetermined depth, are provided at the top and bottom, respectively, of the left side surface of the holding portion 20L. A central axis of the holes 20a and 20b is parallel to a plane on which the optical axes Ol and Or lie, and extends in the direction perpendicular to the optical axes Ol and Or. Similarly, holes 20c and 20d are provided on the right surface of the holding portion 20R.

A guide bar 61 comprises lateral-direction guide portions 61a and 61b, which are parallel to each other, and a lengthwise-direction guide portion 61c, which connects the lateral-direction guide portions 61a and 61b. The length of the lengthwise-direction guide portion 61c, along its central axis, approximately equals a distance between the holes 20a and 20b. The lateral-direction guide portion 61a is slidably received by the hole 20a, and the lateral-direction guide portion 61b is slidably received by the hole 20b.

A guide bar 62 comprises lateral-direction guide portions 62a and 62b, which are parallel to each other, and a lengthwise-direction guide portion 62c, which connects the lateral-direction guide portions 62a and 62b. The length of the lengthwise-direction guide portion 62c, along its central axis, approximately equals a distance between the holes 20c and 20d. The lateral-direction guide portion 62a is slidably received by the hole 20c, and the lateral-direction guide portion 62b is slidably received by the hole 20d.

Namely, the lens holding frame 20 is supported by the guide bars 61 and 62, and can be moved, in the lateral direction, between the extremes of the leading-end faces of the lateral-direction guide portions 61a and 61b abutting against the bottom-end faces of the holes 20a and 20b, and the leading-end faces of the lateral-direction guide portions 62a and 62b abutting against the bottom-end faces of the holes 20c and 20d.

The lengthwise-direction guide portion 61c is supported by a projecting portion 12, formed on the inner surface of the outer frame of the binoculars 1, so as to be slidable in a longitudinal direction along the central axis thereof. Similarly, The lengthwise-direction guide portion 62c is supported by a projecting portion 13, formed on the inner surface of the outer frame of the binoculars 1, so as to be slidable in a longitudinal direction along the central axis thereof.

A configuration of the connecting portion 20C is cuboid, in which a through-hole 23 is formed. The through-hole 23 is defined by internal surfaces 23a and 23b, facing each other, which are parallel to the plane in which the optical axes Ol and Or lie, and internal surfaces 23c and 23d, facing each other, which are perpendicular to the internal surfaces 23a and 23b.

A first direct-drive-type actuator, generally indicated by reference 133, and a second direct-drive-type actuator, generally indicated by reference 134, are disposed in the opening 23. The first direct-drive-type actuator 133 comprises a stepping motor 133a, and shafts 133b, 133c (movable portions). The stepping motor 133a comprises a motor case 133d and a rotor (omitted in FIGS. 2 and 3) mounted in the motor case 133d. The rotor can be rotated clockwise and counterclockwise around a central longitudinal axis of the shafts 133b and 133c. The motor case 133d is fixed on the inner surface (omitted in FIGS. 2 and 3) of the binoculars 1.

The shafts 133b and 133c are supported so as to be movable in the longitudinal direction thereof and rotatable in accordance with the rotational operation of the rotor. Threads (omitted in FIGS. 2 and 3) are formed on the outer surface of the shafts 133b and 133c, and the shafts 133b and 133c are respectively engaged with female threads (omitted in FIGS. 2 and 3) formed on the inner surface of quills of the motor case 133d.

Namely, when the rotor is rotated clockwise, the shaft 133b extends and the shaft 133c retracts in the longitudinal direction thereof, with a clockwise rotation. When the rotor is rotated counterclockwise, the shaft 133b retracts and the shaft 133c extends in the longitudinal direction thereof with a counterclockwise rotation. The tip (projecting end-face) of the shaft 133b is in slidable contact with the surface 23c at all times, and the tip (projecting end-face) of the shaft 133c is in slidable contact with the surface 23d at all times. The second direct-drive-type actuator, generally indicated by reference 134, has a construction similar to that of the first direct-drive-type actuator 133. A rotor of a stepping motor 134a can be rotated clockwise and counterclockwise around a central longitudinal axis of the motor case 134d. When the rotor is rotated clockwise, the shaft 134b extends and the shaft 134c retracts in the longitudinal direction thereof, with a clockwise rotation. When the rotor is rotated counterclockwise, the shaft 134b retracts and the shaft 134c extends in the longitudinal direction thereof, with a counterclockwise rotation. The tip of the shaft 134b is in slidable contact with the surface 23a at all times, and the tip of the shaft 134c is in slidable contact with the surface 23b at all times.

When the rotor of the stepping motor 133a is rotated clockwise, the shaft 133b extends in the direction x1 (see FIG. 3) and the shaft 133c retracts, so that the lens holding frame 20 is moved in the direction x1. On the other hand, when the rotor of the stepping motor 133a is rotated counterclockwise, the shaft 133b retracts and the shaft 133c extends in the direction x2 (see FIG. 3), so that the lens holding frame 20 is moved in the direction x2.

When the rotor of the stepping motor 134a is rotated clockwise, the shaft 134b extends in the direction y1 (see FIG. 3) and the shaft 134c retracts, so that the lens holding frame 20 is moved in the direction y1. On the other hand, when the rotor of the stepping motor 134a is rotated counterclockwise, the shaft 134b retracts and the shaft 134c extends in the direction y2 (see FIG. 3), so that the lens holding frame 20 is moved in the direction y2.

Note that, in this specification, one drive step refers to a unit movement by which the stepping motors 133a and 134a are driven, and one step driving amount refers to a rotational displacement of the shafts 133b, 133c, 134b, 134c when each of the stepping motors 133a and 134a is driven by one drive step.

As shown in FIG. 1, the above-described apparatus is incorporated in the binoculars 1, in such a manner that the correction lenses 21 and 22 are respectively displaced between the objective lenses 31, 32 and the eyepieces 51, 52, in the optical paths of the objective lenses 31, 32.

Figure 4:
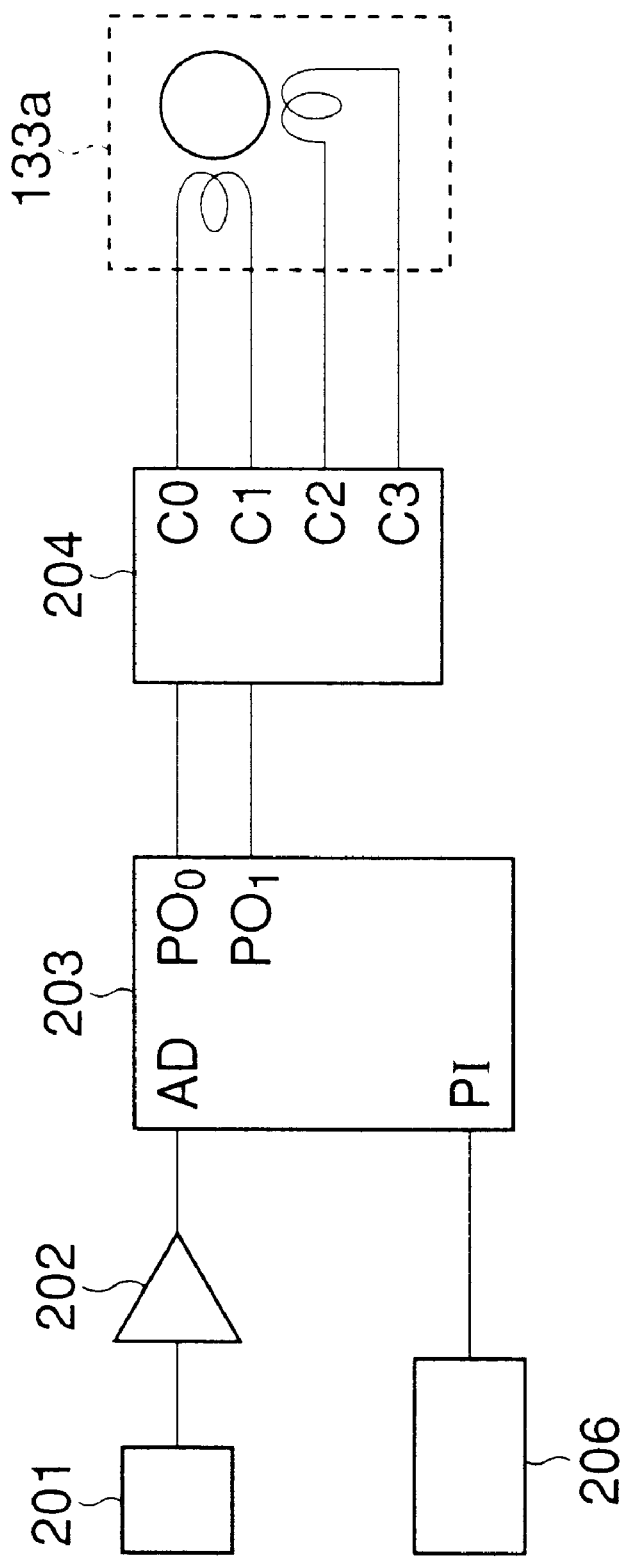
FIG. 4 is a block diagram indicating a correction lens driving circuit.

FIG. 4 is a block diagram indicating a correction lens driving circuit which corrects a movement of the optical axis in the lateral direction.

A lateral-direction gyro sensor 201 detects an angular speed of the optical axis of the binoculars in the lateral direction, and outputs a voltage signal according to the angular speed. The voltage signal, outputted from the lateral-direction gyro sensor 201, is inputted to CPU 203 through an A/D conversion input terminal AD, after being amplified by a lateral-direction amplifier 202. The voltage signal is converted to a digital signal by the A/D conversion input terminal. In CPU 203, the digital signal is subjected to predetermined operations, such as an integration, and a control signal of two bits is generated. The control signal is outputted through output ports PO0 and PO1. A lateral-direction driving circuit 204 is connected to the output ports PO0 and PO1. In the lateral-direction driving circuit 204, a driving signal of the first direct-drive-type actuator 133 is generated based on the control signal inputed from the CPU 203. The driving signal is outputted through output terminals C0, C1, C2 and C3.

Driving coils of the stepping motor 133a of the first direct-drive-type actuator 133 are connected to the output terminals C0, C1, C2 and C3. In accordance with the driving signal, electric current flow in a predetermined direction at the driving coils, so that the rotor of the stepping motor 133a is rotated in a predetermined direction.

An oscillator 206 is connected to an input port P1 of the CPU 203. The oscillator 206 generates a timing clock for the A/D conversion, and outputs a pulse signal based on the timing clock. In accordance with the pulse signal outputted from the oscillator 206, the A/D conversion is performed in the A/D conversion input terminal AD.

As described above, the rotor of the stepping motor 133a is rotated clockwise or counterclockwise by a predetermined number of pulses, based on the angular speed of the optical axis of the binoculars in the lateral direction, detected by the lateral-direction gyro sensor 201. Accordingly, the lens holding frame 20 is pushed canceling the movement of the focused image in the lateral direction, so that the trembling of the focused imaged is corrected.

Note that a lengthwise-direction gyro sensor, a lengthwise-direction amplifier and a lengthwise-direction driving circuit (which are omitted in FIG. 4) are also connected to the CPU 203, in order to correct a trembling of the focused image in the lengthwise direction, performing a similar operation to that with respect to the lateral direction. As described above, the first direct-drive-type actuator 133 is connected to the lateral-direction driving circuit. Similarly, the second direct-drive-type actuator 134 is connected to the lengthwise-direction driving circuit. The stepping motor 134a of the second direct-drive-type actuator 134 is driven based on the driving signal outputted from the lengthwise-direction driving circuit, correcting the trembling of the focused image in the lengthwise direction.

Figure 5:
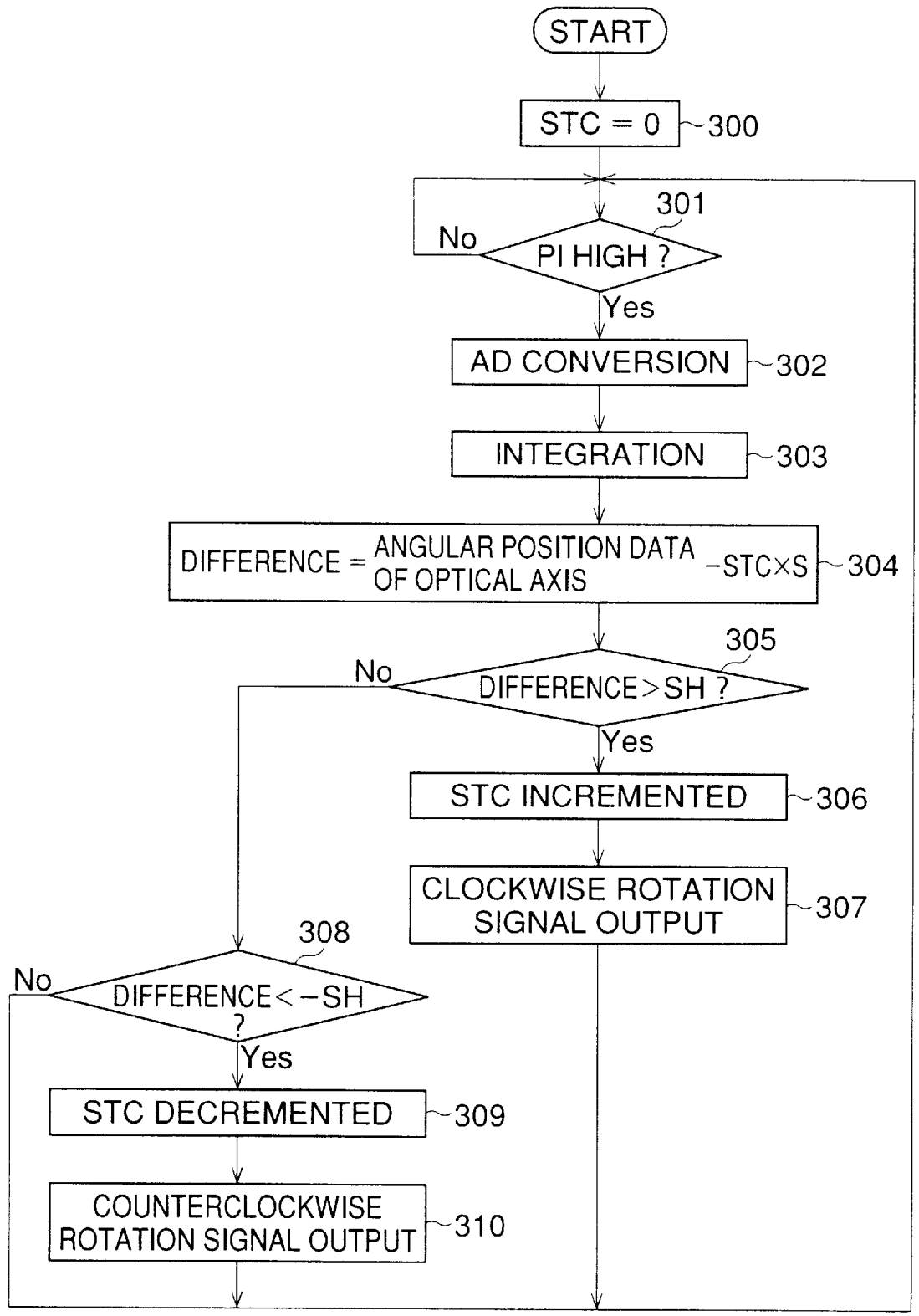
FIG. 5 is a flow-chart indicating a control of the trembling correction of the focused image.

FIG. 5 is a flow-chart indicating a control of the trembling correction of the focused image in the lateral direction.

After a control program is started by a switch operation of the binoculars, in step 300, a variable STC, which represents an accumulated rotation step number of the rotor provided in the stepping motor 133a (see FIG. 2), is cleared. When the rotor rotates clockwise, a step number of the clockwise rotation is added to the variable STC. When the rotor rotates counterclockwise, a step number of the counterclockwise rotation is subtracted from the variable STC. In step 301, it is checked that the signal inputted to the input port PI is high. If the signal is high, namely, the pulse, outputted from the oscillator 206 (see FIG. 4), is detected, the process goes to step 302. While the pulse is not detected, the process does not go to a next step, as the oscillator 206 has not yet started. Namely, the process waits for the detection of the pulse, and the processes from step 302 are performed only when the pulse signal is detected.

In step 302, the voltage signal, which is amplified in the lateral-direction amplifier 202 after being outputted from the lateral-direction gyro sensor 201, is converted to a digital signal in the A/D conversion input terminal AD of the CPU 203. Then, in step 303, an integrating operation is performed. In the integrating operation, the digitized voltage signal is accumulated each time the voltage signal, outputted from the lateral-direction gyro sensor 201, is digitized. Consequently, data, which indicates an angular position of the optical axis of the binoculars in the lateral direction, is calculated.

In step 304, the variable STC is multiplied by a driving amount S of the lens holding frame 20 corresponding to a one step rotation of the stepping motor 133a. And then, the difference between the angular position data in the lateral direction and a result of the multiplication is calculated. Namely, in step 304, the angular position data of the optical axis of the binoculars and the distance of the correction lenses 21 and 22 from a standard position is calculated. Note that, in this specification, the standard position means a position in which optical axes Ol and Or of the correction lenses 21 and 22 are coaxial with the optical axis of the other optical systems of the binoculars.

In step 305, the difference is compared with a positive threshold value SH. If the difference exceeds the positive threshold value SH, the process goes to step 306, and if the difference is below the positive threshold value SH, the process goes to step 308. Note that, in this embodiment, the threshold value SH equals a quarter of the driving amount S.

The angular position data of the optical axes of the binoculars is calculated by integrating the output of the gyro sensor 201. On the other hand, when the lens holding frame 20 is moved in the direction x1, the clockwise rotation step number of the rotor is added to the variable STC, and when the lens holding frame 20 is moved in the direction x2, the counterclockwise rotation step number of the rotor is subtracted from the variable STC. Accordingly, when the difference exceeds the positive threshold value SH, the angular position data in the lateral direction of the optical axes of the binoculars exceeds the current position of the correction lenses 21 and 22, i.e. STC*S, by not less than a quarter of the driving amount S.

In step 306, the variable STC is incremented, and then in step 307, the control signal, by which the stepping motor is rotated clockwise by one step, is outputted through the output ports PO0 and PO1. By the clockwise rotation of the stepping motor 133a, the lens holding frame 20 is moved in the direction x1, so that the movement of the optical axes of the other optical systems of the binoculars in the direction x2, is canceled by a predetermined amount.

On the other hand, in step 308, the difference is compared with a negative threshold value SH. If the difference is below the negative threshold value SH, the procedure goes to step 309. When the difference is below the negative threshold value SH, the angular position data of the optical axes of the binoculars is below the current position of the correction lenses 21 and 22, i.e. STC*S, by not less than the quarter of the driving amount S of the lens holding frame 20. In step 309, the variable STC is decremented, and then, in step 310, the control signal, by which the stepping motor is rotated counterclockwise by one step, is outputted through the output ports PO0 and PO1. By the counterclockwise rotation of the stepping motor 133a, the lens holding frame 20 is moved in the direction x2, so that the movement of the optical axes of the other optical systems of the binoculars in the direction x1, is canceled by a predetermined amount.

In step 308, if the difference exceeds the negative threshold value SH, the process returns to step 301. Namely, when the difference is between the negative threshold value SH and the positive threshold value SH, the stepping motor 133a is not rotated, and the control program waits for the detection of a next pulse signal.

Figure 6:
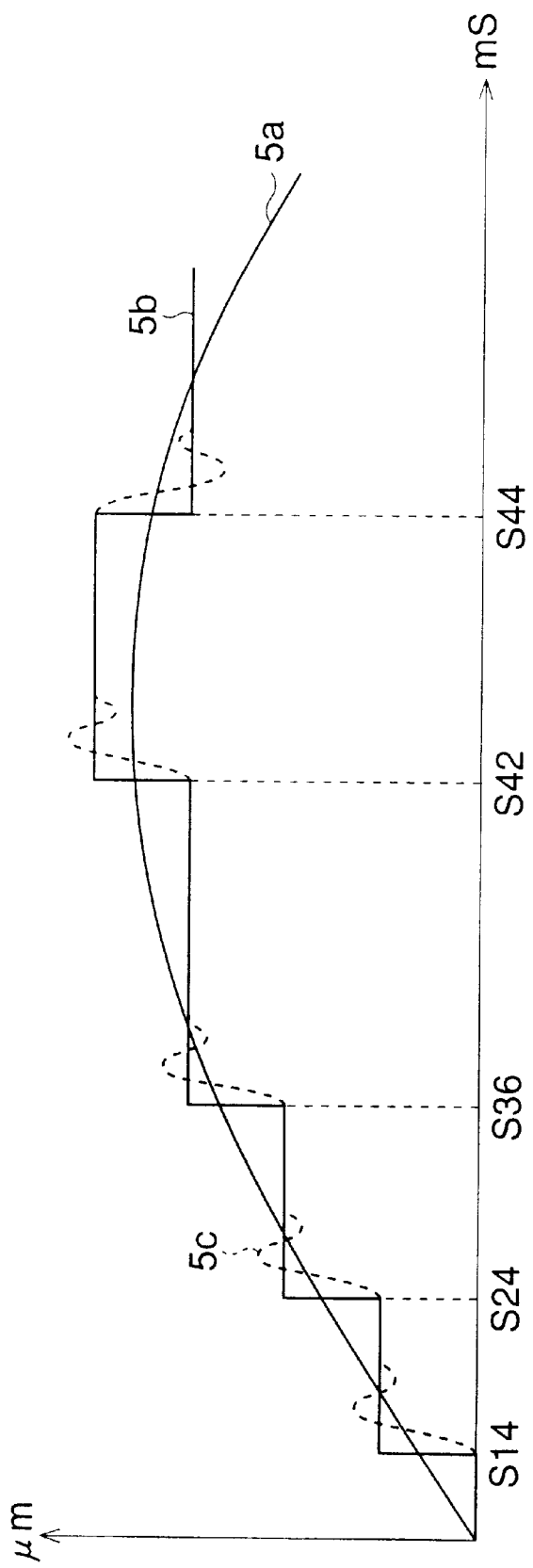
FIG. 6 is a graph when a threshold is set to a half of a moving amount of a lens holding frame corresponding to a one step rotation of a stepping motor.
Figure 7:
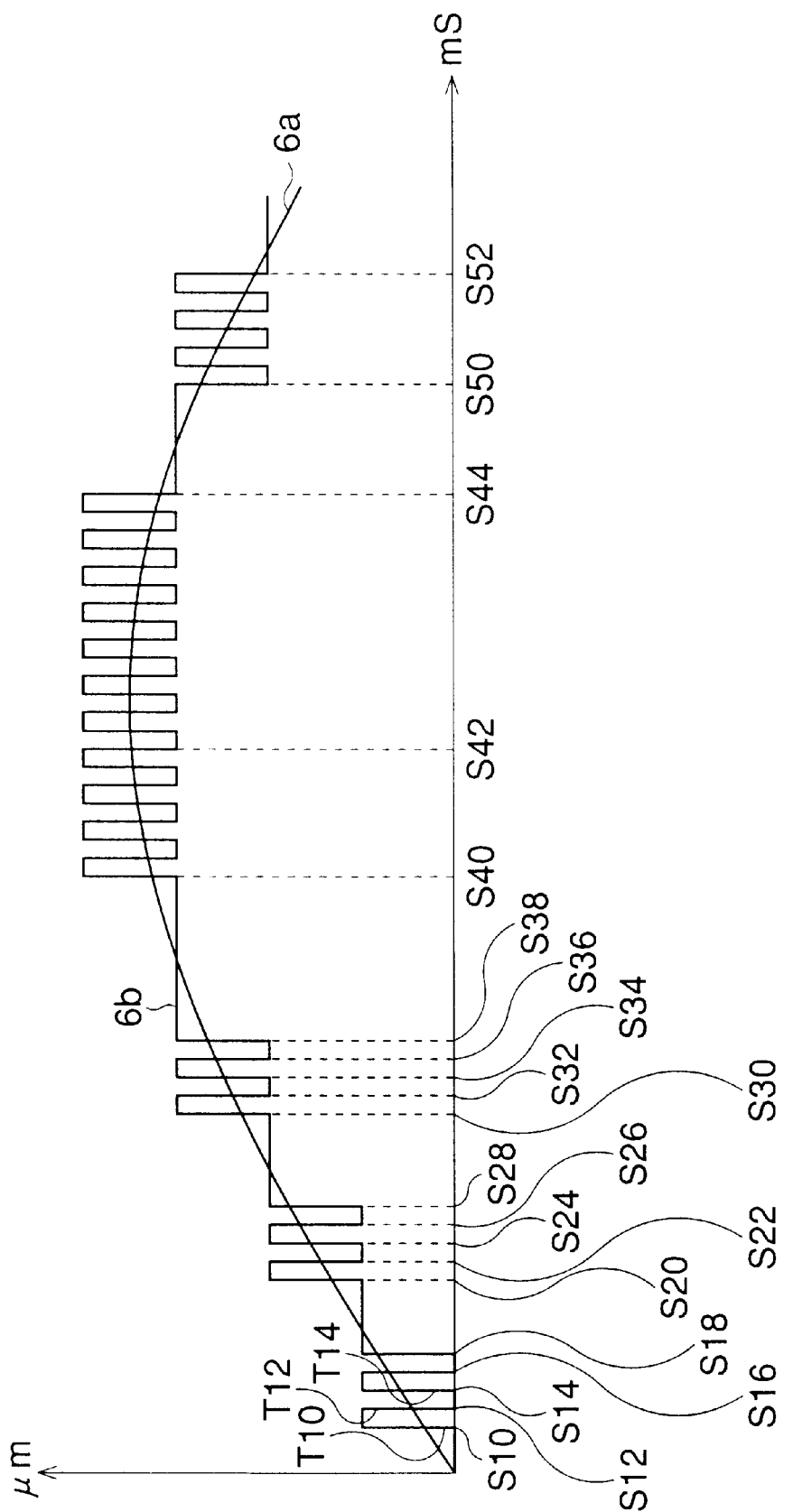
FIG. 7 is a graph when the threshold is set to a quarter of the moving amount.
Figure 8:
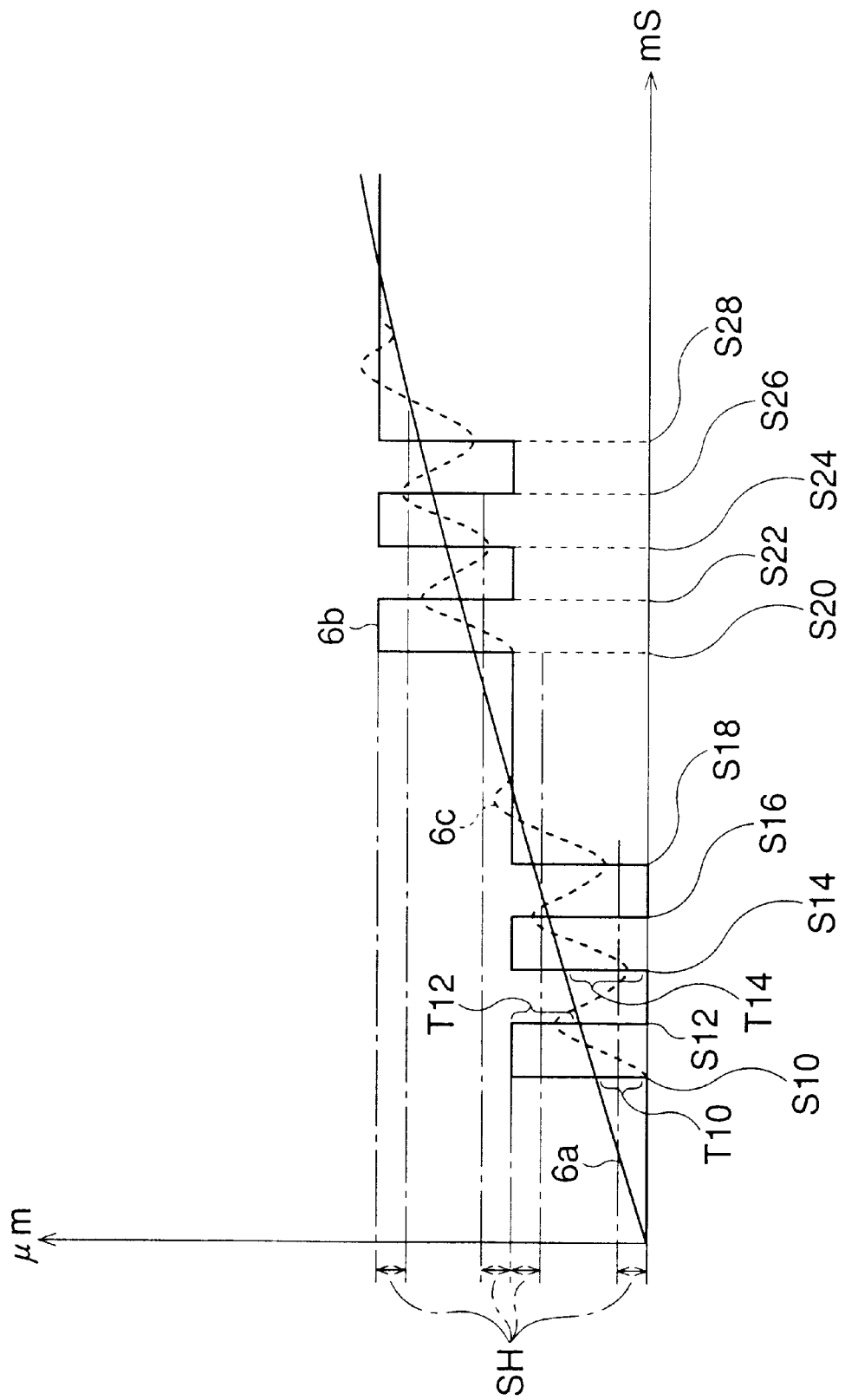
FIG. 8 is a graph showing a portion of FIG. 7, enlarged along the time axis.

With reference to FIGS. 6 through 8, the function of this embodiment will be explained. FIGS. 6 through 8 are graphs indicating a focused image trembling signal and the moving amount of the correction lenses 21, 22. FIG. 7 indicates the graphs when the threshold value SH is determined to be a quarter of the driving amount S of the lens holding frame 20. FIG. 8 indicates a portion of FIG. 7, enlarged along the time axis. FIG. 6 indicates the graphs when the threshold value SH is determined to be a half of the driving amount S in the binoculars 1.

In FIG. 6, a curve 5a is a wave indicating a focused image trembling signal, i.e. a moving amount of the binoculars, calculated by integrating the output of the gyro sensor. A line 5b indicates a theoretical change of a moving amount of the correction lenses 21 and 22, i.e. the resulting value of the multiplication of the variable STC and the driving amount S of the lens holding frame 20 corresponding to one step rotation of the stepping motor. Namely, the line 5b indicates a theoretical movement of the correction lenses 21 and 22. A broken curve 5c indicates an actual movement of the correction lenses 21 and 22.

In FIG. 6, when the difference, between the focused image trembling signal and the moving amount of the correction lenses, exceeds half of the driving amount S of the lens holding frame, the line 5b indicates a stepped-increase or a stepped-decrease. Namely, at S14, S24, S36, S42 and S44, the lens holding frame is driven. There is a response-delay from the output of the driving signal at S14, S24, S36, S42 and S44, to the start of the actual movement of the lens holding frame. Further, when the rotor is driven, an overshoot occurs caused by a mechanical character of the stepping motor and inertia of the lens holding frame 20. Accordingly, the correction lenses actually move along the broken curve 5c, so that a jump of the focused image, explained below, is viewed. The amount of the overshoot is larger, as one step driving amount of the stepping motor is larger.

Generally, a user feels uncomfortable when the viewed focused image, moved by the correction lenses, overshoots an appropriate correctional position, at which the trembling of the focused image is canceled, before returning to the appropriate position.

Figure 9:
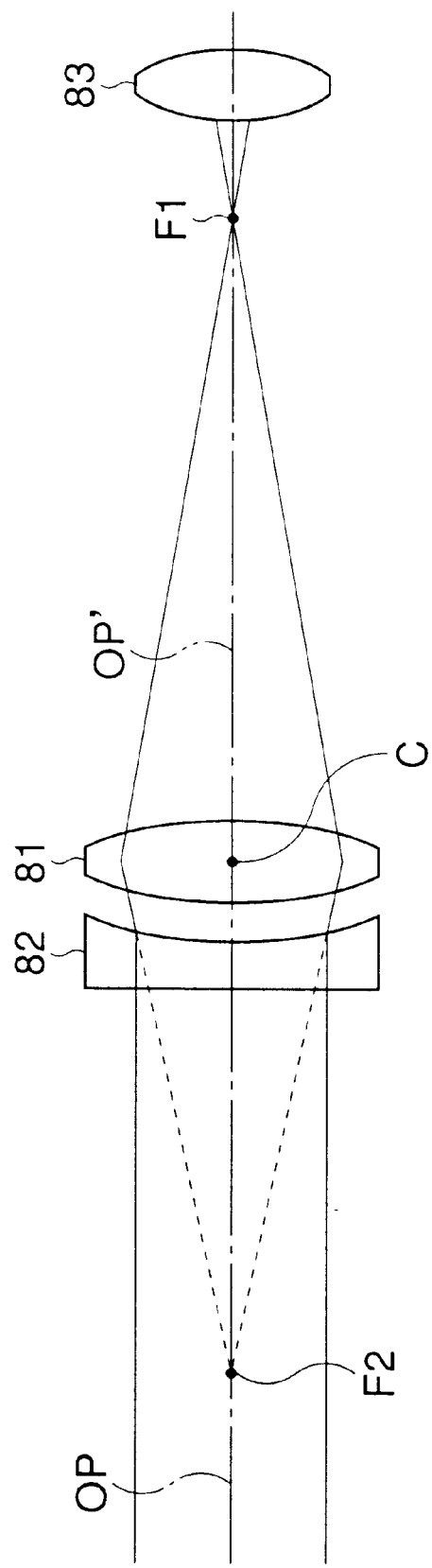
FIG. 9 is a view showing a construction of an optical system when an optical axis of the correction optical system is coaxial with optical axes of other optical systems.
Figure 10:
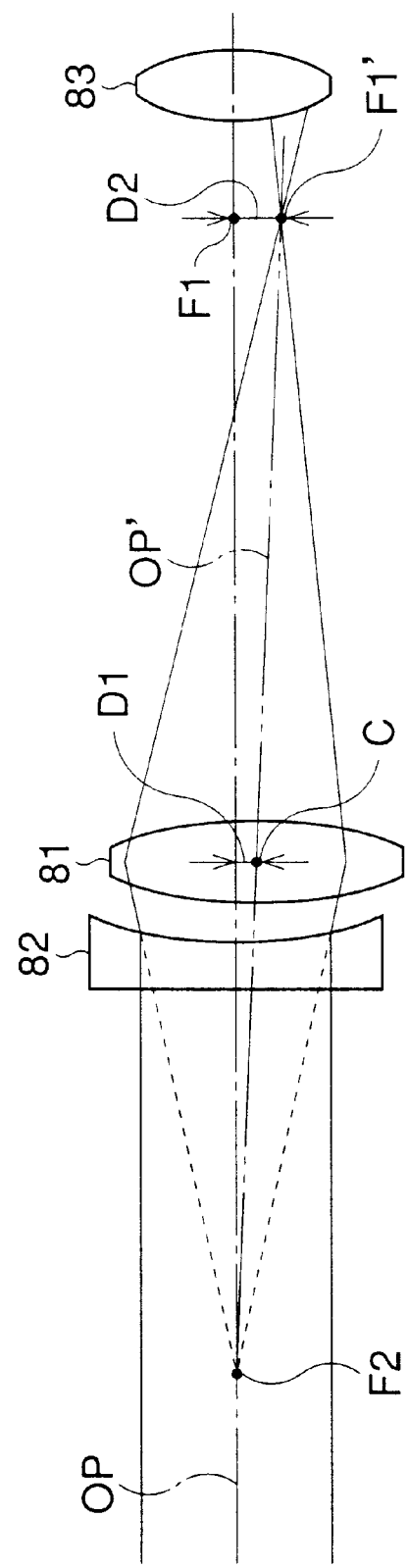
FIG. 10 is a view showing the construction of the optical system when the optical axis of the correction optical system is moved from the position shown in FIG. 9 by a predetermined amount.

FIGS. 9 and 10 respectively show a typical construction of an optical system provided with a focused image trembling correction component. In FIG. 9, an optical axis OP' of a correction lens 81 is coaxial with an optical axis OP of other optical systems, such as an objective lens 82 and an eyepiece 83. Accordingly, a distant object (omitted in FIG. 9), which is located on the optical axis OP is imaged on a compound focal point F1 of the objective lens 82 and the correction lens 81. The image of the object is viewed by a user, after being enlarged by the eyepiece 83. In this construction of the optical system, a virtual image of the object is formed at a focal point F2 by the objective lens 82, and a real image corresponding to the virtual image is formed at the compound focal point F1 by the correction lens 81.

As shown in FIG. 10, if the correction lens 81 is moved in such a manner that the optical axis OP' is moved from the position of the optical axis OP by a distance D1, the real image of the object is imaged on a compound focal point F1 which is located on a line connecting the focal point F2 and a center C of the correction lens 81. The compound focal point F1' is moved from the compound focal point F1 by a distance D2. In other words, if the focused image on the compound focal point F1 is moved by the distance D2, the trembling of the focused image is able to be canceled by moving the correction lens 81, by the distance D1, in a direction opposite to the direction the real image is moved.

The image jump will be explained using binoculars having an objective lens and a correction lens with 120 mm compound focal lengths, 12 powers of magnification and an eyepiece with a 10 mm focal length. Further, in the binoculars, the rotational amount of the rotor of the tremble correction apparatus by one step is set at a predetermined level, whereby the compound focal point moves by 20 μm in accordance with one drive step of the stepping motor.

When the stepping motor is driven by one step, a user perceives a 500 μm movement of the focused image from a distance of distinct vision, that is, a distance from the user's eyes being 250 mm. In the case that the speed of the user's hand trembling is relatively low, corresponding to the curve 5a of FIG. 6, the 500 μm movement of the focused image from the distance of distinct vision is viewed as an image jump corresponding to the broken curve 5c of FIG. 6, causing discomfort to the user's sight.

In the above-mentioned case, it may be possible that the length D2, corresponding to one drive step of the stepping motor, is pre-set to be less than 20 μm in order to prevent the image jump. However, the focused image usually trembles at speeds greater than 20 μm per ms around the compound focal point F1 due to the hand trembling. On the other hand, the least upper bound of the driving frequency of the stepping motor is about 1000 pps (pulses per second). Accordingly, if the length D2 is determined to be less than 20 μm, the movement of the correction lens 81 cannot follow the trembling speed of the focused image when the speed of the user's hand trembling is relatively high. Consequently, the appropriate correction cannot be performed.

In FIGS. 7 and 8, a curve 6a is the wave of the focused image trembling signal and a line 6b indicates the theoretical movement of the correction lenses 21 and 22. In FIG. 8, a broken curve 6c indicates the actual movement of the correction lenses 21 and 22. Note that, a time axis of the graph of FIG. 7 is similar to that of the graph of FIG. 6.

In FIGS. 7 and 8, from a start to S10, the difference between the focused image trembling signal (6a) and the moving amount (6b) of the correction lenses 21 and 22 is lower than the predetermined positive threshold value SH, and as such, the rotor of the stepping motor 133a is not rotated, and the lens holding frame 20 is not driven. Thus, the moving amount of the correction lenses 21 and 22 continues to be "0" prior to S10.

From S10 through S18, the rotor of the stepping motor 133a is rotated clockwise and counterclockwise, alternately and repeatedly. In accordance with the rotation of the rotor, the lens holding frame 20 reciprocates in the lateral direction repeatedly.

At S10, the difference T10 between the focused image trembling signal (6a) and the moving amount (6b) of the correction lenses 21 and 22 exceeds the predetermined positive threshold value SH. Then, the stepping motor 133a is rotated clockwise and the correction lenses 21 and 22 are moved in the direction x1 by a predetermined amount in accordance with the one step clockwise rotation of the rotor. The moving amount of the lens holding frame 20 corresponding to the one step rotation of the stepping motor 133a is higher than the moving amount of the binoculars 1 caused by the hand trembling. Namely, the moving amount of the lens holding frame 20 driven by the clockwise rotation of the rotor at S10, exceeds the moving amount of the binoculars 1 caused by the hand trembling from S10 through S12.

Accordingly, the difference T12 between the focused image trembling signal (6a) and the moving amount (6b) of the correction lenses 21 and 22 becomes lower than the predetermined negative threshold value SH. Thus, the stepping motor 133a is rotated counterclockwise by one step. In accordance with the one step counterclockwise rotation of the rotor, the correction lenses 21 and 22 are moved in the direction x2 by a predetermined amount.

The moving amount of the lens holding frame 20 at S12 is higher than the moving amount of the binoculars 1 caused by the hand trembling from S12 through S14. Accordingly, the difference T14 between the focused image trembling signal (6a) and the moving amount (6b) of the correction lenses 21 and 22 exceeds the predetermined positive threshold value SH. Thus, the stepping motor 133a is rotated clockwise, and the correction lenses 21 and 22 are moved in the direction x1 by a predetermined amount, in accordance with the one step clockwise rotation of the rotor. The reciprocation as described above is repeated from S10 through S18.

From S18 through S20, the difference between the focused image trembling signal (6a) and the moving amount (6b) of the lens holding frame 20 is lower than the predetermined positive threshold value SH and is higher than the predetermined negative threshold value SH. Accordingly, the stepping motor 133a is not rotated, and the lens holding frame 20 is not driven.

From S10 through S18, the reciprocation is performed each time the stepping motor 133a is driven by one step. As shown in FIG. 8, the broken curve 6c does not follow the line 6b similarly to the broken curve 5c of FIG. 6, but follows the curve 6a, oscillating with a small amplitude. Namely, an overshoot in the movement of the correction lenses 21 and 22 does not occur. Consequently, the image jump, which occurs with the aforementioned binoculars relating to FIG. 6, is prevented. From S20 through S28, S30 through S38, S40 through S44, and S50 through S52, the reciprocation, similar to that from S10 through S18, is performed with the correction lenses 21 and 22 following the focused image trembling signal (6a).

As described above, in this embodiment, the correction lenses 21 and 22 closely follow the focused image trembling signal (66a), vibrating with a small amplitude, and the overshoot, caused by the rotation of the rotor of the stepping motor, is prevented. Accordingly, image jump is prevented.

In this embodiment, the threshold value SH is set to a quarter of the driving amount S of the lens holding frame 20. Accordingly, as shown in FIGS. 7 and 8, a driving interval of the lens holding frame 20 is shorter and reciprocation of the lens holding frame 20 is performed at a higher frequency than when the threshold value SH is set to a half of the driving amount S (see FIG. 6). Therefore, the movement caused by the inertia of the lens holding frame 20 is more effectively canceled, and then an effect whereby the inertia of the lens holding frame 20 is lowered can be obtained.

Further, the driving of the lens holding frame 20 beyond the curve 6a, which corresponds to the ideal positional characteristic of the driving, is more effectively prevented, so that the overshoot can be minimized. Therefore, the lens holding frame 20 can be driven in closer conformance with the curve 6a. Namely, the driving of the lens holding frame 20 can be more accurately controlled, thus minimizing distress to the user.

In this embodiment, the threshold value SH is set to be a quarter of the driving amount S of the lens holding frame 20 corresponding to one step rotation of the rotor of the stepping motor 133a. However, the threshold value SH can be pre-set as required to be lower than a half of the driving amount S, enabling the correction lenses 21 and 22 to still be reciprocated without overshoot. Preferably, the threshold value SH may be determined to be between one third and one tenth of the driving amount S.

As described above, according to the present invention, in the focused image trembling correction device, the focused image trembling can be more accurately followed by the correcting apparatus, preventing image jump.

Although the embodiments of the present invention have been described herein with reference to the accompanying drawings, obviously many modifications and changes may be made by those who are skilled in this art without departing from the scope of the invention.

The present disclosure relates to subject matter contained in the following japanese patent application no.10-114733 (filed on Apr. 24, 1998), which is expressly incorporated herein, by reference, in its entirety.

What is claimed is:

1. An apparatus that corrects a trembling of a focused image comprises:

a detector that detects a trembling amount of an optical device;

correction optical systems that correct a trembling of a focused image caused by a tremble of said optical device;

a driving device that drives said correction optical systems by a predetermined amount per one drive step; and a controller that controls said driving device such that, when a difference between said trembling amount detected by said detector and a position data of said correction optical systems, calculated based on a one step driving amount of said driving device, reaches a predetermined threshold value, said driving device is driven to cancel said difference, wherein said predetermined threshold value is pre-set to less than a half of the driving amount of said correction optical systems corresponding to one drive step of said driving device.

2. The apparatus of claim 1, wherein said predetermined threshold value is pre-set to within a range of one third to one tenth of said driving amount of said correction optical systems corresponding to one drive step of said driving device.

3. The apparatus of claim 2, wherein said predetermined threshold value is pre-set to a quarter of said driving amount.

4. The apparatus of claim 1, wherein said driving device includes at least one stepping motor.

5. The apparatus of claim 1, wherein said optical device is a pair of binoculars that includes a pair of telephoto optical systems.

6. An apparatus that corrects a trembling of a focused image comprises:

a detector that detects a trembling amount of an optical device;

correction optical systems that correct a trembling of a focused image resulting from a tremble of said optical device;

a driving device that drives said correction optical systems by a predetermined amount per one drive step; and a controller that controls said driving device such that, when a difference between said trembling amount detected by said detector and a position data of said correction optical systems calculated based on one step driving amount of said driving device, exceeds a positive value of a predetermined threshold or is below a negative value of said predetermined threshold, said driving device is driven so that said difference is canceled;

wherein said predetermined threshold is determined to be less than a half of said driving amount of said correction optical systems corresponding to one drive step of said driving device.

7. An apparatus that corrects a trembling of a focused image comprises:

a detector that detects a trembling amount of an optical device;

correction optical systems that correct a trembling of a focused image caused by a tremble of said optical device;

a driving device that drives said correction optical systems by a predetermined amount; and a controller that controls said driving device such that, when a difference between said trembling amount detected by said detector and a position data of said correction optical systems, which is calculated based on said predetermined amount, reaches a predetermined threshold value, said driving device is driven canceling said difference, wherein said predetermined threshold value is pre-set to less than a half of said predetermined amount.

* * * * *

UNITED STATES PATENT AND TRADEMARK OFFICE
CERTIFICATE OF CORRECTION

PATENT NO. : 6,064,532
DATED : May 16, 2000
INVENTOR(S) : S. ENOMOTO

It is certified that error appears in the above-identified patent and that said Letters Patent is hereby corrected as shown below:

On the cover of the printed patent, at Item [73], Assignee, after "Kogaku" insert ---Kogyo---.

Signed and Sealed this

Third Day of April, 2001

*Attest:*

NICHOLAS P. GODICI

*Attesting Officer*   Acting Director of the United States Patent and Trademark Office